PULSE COMMUNICATION SYSTEM

Filed Sept. 30, 1963 4 Sheets-Sheet 1

INVENTOR
ANATOLE MINC
BY Pennie, Edmonds, Morton, Taylor and Adams
ATTORNEYS

PULSE COMMUNICATION SYSTEM

Filed Sept. 30, 1963

INVENTOR
ANATOLE MINC
BY Pennie, Edmonds, Morton, Taylor and Adams
ATTORNEYS

INVENTOR
ANATOLE MINC
BY Pennie, Edmonds, Morton, Taylor and Adams
ATTORNEYS

INVENTOR
ANATOLE MINC
BY Pennie, Edmonds, Morton, Taylor and Adams
ATTORNEYS 3,354,433
PULSE COMMUNICATION SYSTEM
Anatole Minc, Upper Brookville, N.Y., assignor to Tele-Signal Corporation, Woodbury, N.Y., a corporation of New York
Filed Sept. 30, 1963, Ser. No. 312,527
7 Claims. (Cl. 340—167)

ABSTRACT OF THE DISCLOSURE

There is disclosed a pulse communication system in which pulse trains representative of the same information are transmitted over two different frequency channels, and with a delay in one channel of the order of two seconds. At the receiving station separate receivers are provided for the two frequency channels. The receiver for the signal transmitted without delay includes delay elements bringing the outputs of the two receivers back into synchronism. Moreover, both receivers include a pulse sampling and regenerating unit which also measures the distortion in the signal when that distortion exceeds a specified limit. The two receiver outputs pass through an OR circuit to a common load, and means are provided to switch from whichever receiver is feeding the output to the other receiver whenever a control signal from either receiver indicates unacceptable distortion in the receiver producing that control signal, with reception reverting to a preferred one of the receivers after an interval of the order of two seconds in the absence of a control signal during that interval.

*Background of the invention*

This invention relates to a pulse communication system and, more particularly, to such a system utilizing the principle of "time diversity," i.e. a system wherein at least two signals representing the same information are transmitted at two different times and a single information-carrying signal is reconstructed from selected segments of the two transmitted signals.

Reference will hereafter be made to a "synchronous pulse train." This term, as used here, refers to an electrical signal which may take on either of two discrete signal which may take on either of two discrete signal (e.g. voltage) levels, with transitions from one level to the other occurring at time intervals which are integrally related to a predetermined time interval. The pulse train may be of any length (duration) required to transmit desired information.

Heretofore, communication systems have been operated utilizing either space diversity (i.e. spaced receiver antennas) or frequency diversity (i.e. simultaneously sending identical information content on two different frequencies) to reduce the effects of interference, noise and signals fading on the reliability and accuracy of information transmission. While these techniques have been generally effective, transmission errors and distortion have not been eliminated.

*Summary of the invention*

In accordance with the present invention, signals representative of a single information-carrying pulse train (such as a telegraph, telemetry or facsimile signal) are transmitted from a sending terminal to a receiving terminal and, a short time later (i.e. of the order of seconds), the same signals are retransmitted to the receiving terminal. Signal processing apparatus at the receiving terminal is arranged to receive the later (delayed) and earlier (undelayed) transmitted signals and continuously to compare characteristics (e.g. pulse width and pulse spacing) of both the delayed and undelayed pulse trains with the same characteristics of an undistorted standard pulse train. The signal processing apparatus is further arranged to select and regenerate either a predetermined one of the two received pulse trains or, in the event the characteristics of the predetermined pulse train deviate from the characteristics of the standard by more than a predetermined margin, the signal processing apparatus selects and regenerates the second one of the pulse trains. Furthermore, apparatus is provided for delaying the earlier transmitted signal in time at the receiver so that, upon switching from one pulse train to the other at the receiving terminal, no interruption of information flow occurs. That is, a continuous pulse train, substantially identical to the original pulse train produced at the transmitting terminal, is regenerated at the receiving terminal.

The present invention may be applied to pulse communication systems wherein electrical signals are transmitted, for example, either by wire (cables, transmission lines, etc.) or by wireless means (radio). In either case, a system constructed in accordance with the invention provides substantially improved signal reception and reliability of information transmission in the presence of either atmospheric (natural) or man-made disturbances or interference.

While the invention has general utility, it will be described in terms of a frequency shift keyed communication system. In such a system, the presence of a pulse in the information-carrying pulse train results in the transmission for a time duration equal to the pulse width of a burst of an oscillatory signal at one frequency while the absence of a pulse in the train results in the transmission of an oscillatory signal at a second frequency different from the first.

In a preferred embodiment of the invention, the pulse communication system comprises a transmitter and a receiver, the transmitter comprising means for producing an information-carrying pulse train. The transmitter further comprises delay means coupled to the pulse train producing means for delaying the pulse train for a predetermined time interval. The transmitter still further comprises signal transmission means coupled to the pulse producing means and to the delay means for transmitting signals representative of both delayed and undelayed pulse trains to the receiver.

The receiver comprises first and second signal processing channels for receiving and processing signals representative of delayed and undelayed pulse trains respectively. The second (undelayed) signal channel comprises means for delaying the undelayed pulse train for a predetermined time interval. Each of the signal processing channels comprises sampling means for comparing characteristics of the pulse train processed in that channel with like characteristics of an undistorted standard pulse train. Each of the channels further comprises distortion indicating means for producing distortion indications in response to deviations in excess of a predetermined allowable limit of the characteristics of a processed pulse train from the like characteristics of the undistorted pulse train. The receiver still further comprises channel selection means for selecting the output of a preferred channel and, in response to distortion indications, for selecting the output of the other of the two channels for transmission of a single pulse train to a signal utilization device.

*Brief description of the drawings*

The invention will be described further by reference to the accompanying drawings in which.

*Description of preferred embodiments*

Figure 1:
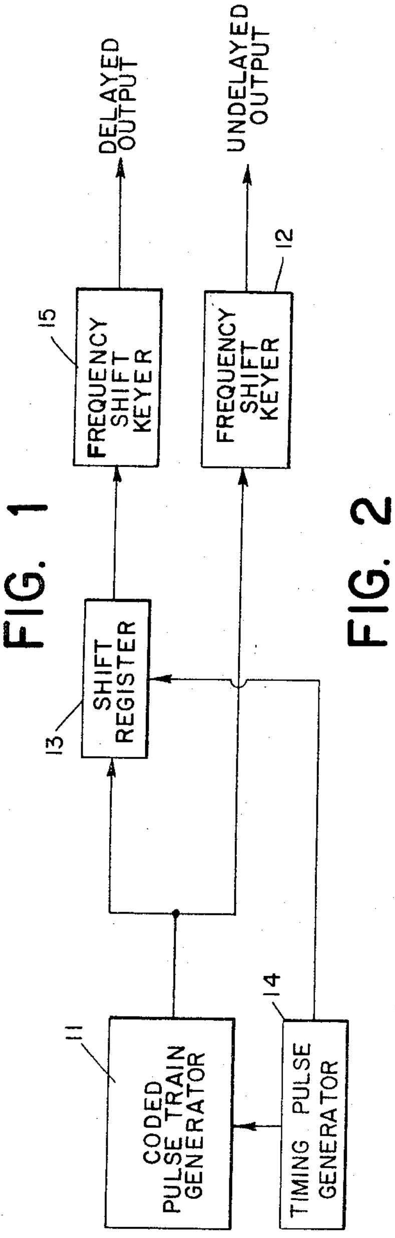
FIG. 1 is a block diagram of a transmitter for use in a pulse communication system embodying the invention.
Figure 5:
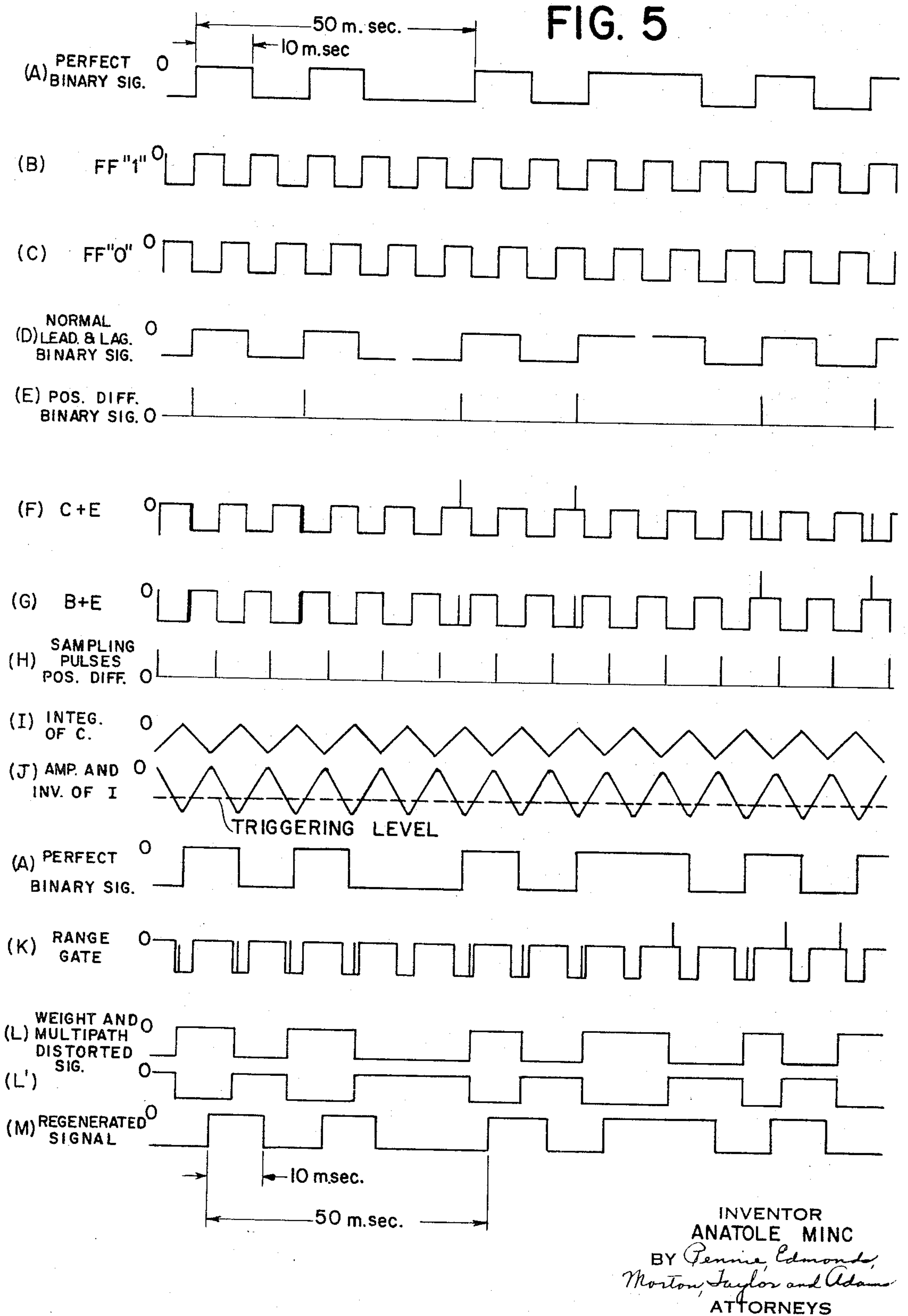
FIG. 5 is a wave-shape diagram for use in connection with the explanation of the operation of the apparatus of FIGS. 1–4.

Referring to FIG. 1, there is shown a coded pulse train generator 11 for producing a synchronous, information-carrying pulse train of the type shown by waveform M in FIG. 5. The pulse train may, for example, be representative of a series of alpha-numeric characters, with each character being represented by a unique coded combination of pulses and no-pulse occurring during a given fixed time interval. For example, a fifty millisecond time interval (see M FIG. 5) may be divided into five smaller (10-millisecond) time intervals. The combination of negative and ground level voltage intervals present during the fifty-millisecond time interval is coded to represent a desired character. Thirty-two combinations are available when five-unit intervals (or "bits") are provided for each character or code group.

The coded pulse train is applied directly to a first frequency shift keyer 12 which may, for example, be an oscillator whose frequency is shifted to either a first ($f_1$) or a second ($f_2$) frequency depending upon whether the output of pulse train generator 11 is at one level (ground) or the other (negative). A conventional reactance tube modulator may be used for this purpose.

The coded pulse train output of generator 11 is also supplied to a signal delay means shown as a shift register 13. Shift register 13 is typically composed of a series of bistable ("flip-flop") stages connected together, for example, as shown at page 160 of the "G.E. Transistor Manual," sixth edition, published by General Electric Company, Syracuse, New York. The choice of the number of stages in register 13 and hence the choice of delay introduced thereby will be explained at a later point.

Timing pulse generator 14, coupled to both pulse train generator 11 and to shift register 13 supplies timing pulses to the former and shift pulses to the latter to advance the pulse train through shift register 13 in synchronism with the production of the pulse train in generator 11.

The delayed output of shift register 13 is applied to a second frequency shift keyer 15 similar to keyer 12. The system will be described hereafter with respect to a keyer 15 which operates at two frequencies ($f_3$ and $f_4$) different from the two frequencies ($f_1$ and $f_2$) of keyer 12. It should be appreciated, however, that by using time-sharing techniques, keyers 12 and 15 may be operated at the same frequencies. The two channels would then be separated on a time basis.

The output of frequency shift keyer 15, hereafter referred to as the delayed output, and the output of frequency shift keyer 12, hereafter referred to as the undelayed output, are amplified and transmitted in a conventional manner to receiving stations either by means of cables or by means of radio transmitting antennas (not shown), depending upon the chosen frequencies of operation ($f_1$, $f_2$, $f_3$ and $f_4$). Both outputs may also be transmitted as modulation on a single carrier signal.

Figure 2:
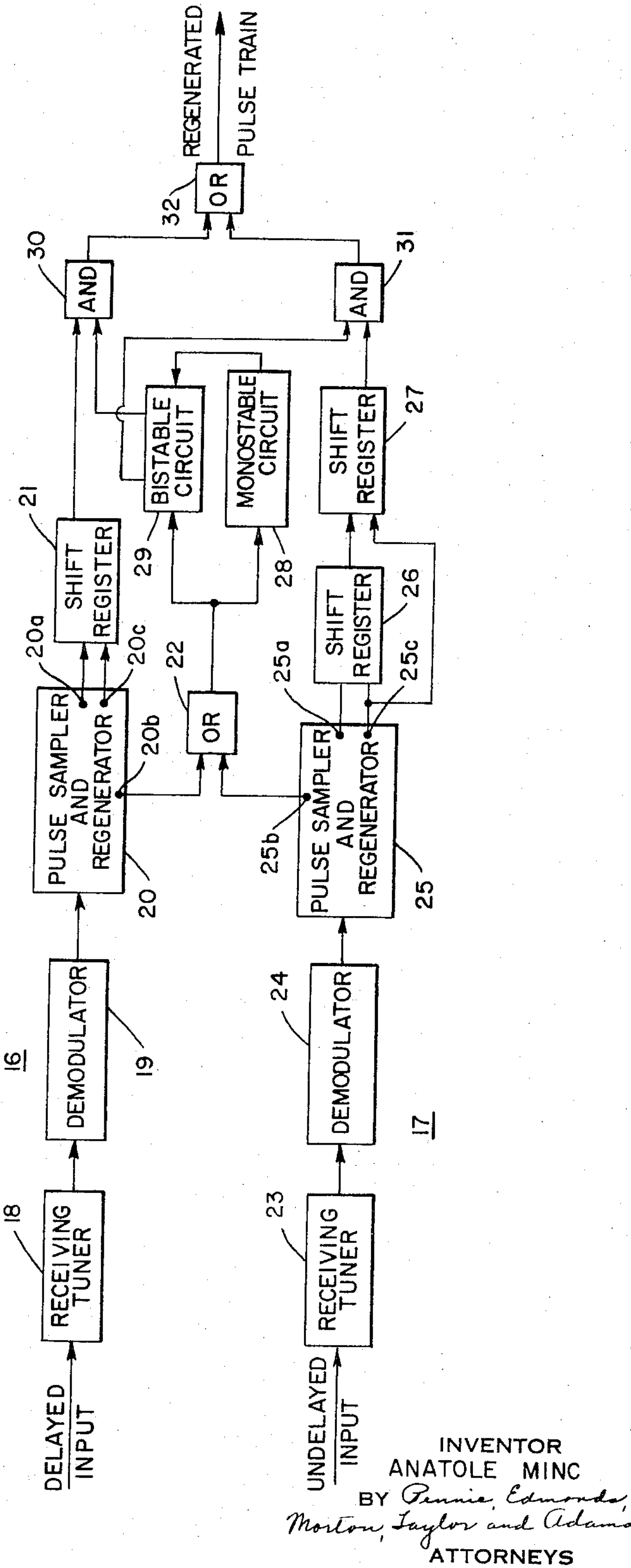
FIG. 2 is a block diagram of a first receiver system for use in a pulse communication system according to a first embodiment of the invention.

Referring now to FIG. 2, one type of receiver for receiving and processing the delayed and undelayed outputs of the FIG. 1 transmitter in accordance with the invention is shown.

Figure 4:
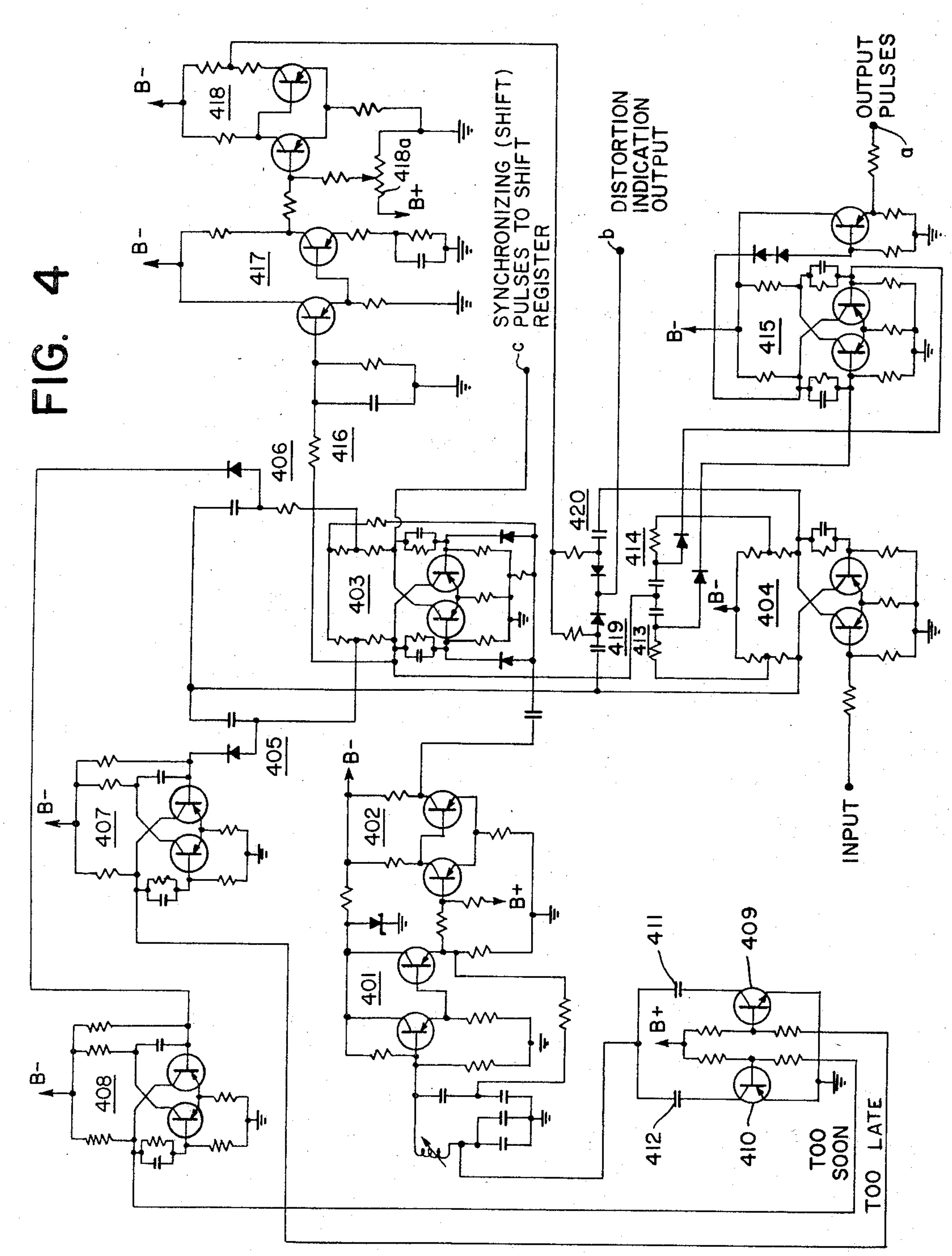
FIG. 4 is an electrical schematic diagram of a pulse sampler and regenerator for use in either the FIG. 2 or FIG. 3 receiver.

The receiver comprises first and second signal processing channels (i.e. delayed and undelayed signal processing channels) indicated generally by the reference numerals 16 and 17, respectively. The first signal processing channel 16 comprises a receiving tuner 18, tuned to receive and amplify signals at the frequencies $f_3$ and $f_4$ associated with frequency shift keyer 15 of FIG. 1. A demodulator 19, such as a conventional ratio detector, serves to reconvert the received two-frequency signal to a two-level (pulse, no-pulse) signal such as is shown at L in FIG. 5. A pulse sampler and regenerator 20, one form of which is shown in detail in FIG. 4, is coupled to the output of demodulator 19. A signal output terminal **20*a* and a timing pulse output terminal 20*c* of sampler and regenerator 20 are coupled to a signal delay means shown as a shift register 21. A distortion indication output terminal 20*b* is coupled to one input of a logical OR gate 22**.

The second signal processing channel 17 includes a receiving tuner 23 tuned to receive and amplify signals at the frequencies $f_1$ and $f_2$ and a demodulator 24 coupled to tuner 23. A pulse sampler and regenerator circuit 25 is coupled to demodulator 24 and include signal output terminal **25*a* and a timing pulse output terminal 25*c* coupled to a shift register 26 and a distortion indication output terminal 25*b* coupled to a second input terminal of OR 22. A second shift register (or delaying means) 27 is coupled to the output of shift register 26. Timing pulse output terminal 25*c* is also coupled to shift register 27. Shift register 27 is arranged to delay signals in channel 17 for a time interval equal to the delay introduced by shift register 13 in the transmitter of FIG. 1. Furthermore, shift registers 21 and 26 introduce equal delays, less than that introduced by shift registers 13 and 27, in each channel of the receiver as will be more fully explained below. Channels 16 and 17 are therefore substantially the same with the exception that the tuners 18 and 23 are tuned to different frequencies and channel 17 includes shift register 27**.

The output of OR 22 is coupled to both the input of a monostable circuit 28 and to one input of a bistable circuit 29. The output of monostable circuit 28 is coupled, in turn, to the second input of bistable circuit 29. A first output of bistable circuit 29 is coupled to one input of an AND gate 30, the second input of which is supplied by shift register 21. The second output of bistable circuit 29, which is complementary to the first output thereof (i.e. varies in an opposite sense), is coupled to one input of an AND gate 31, the second input of which is supplied by shift register 27. The outputs of AND's 30 and 31 are supplied to OR 32, the output of which, in turn, is supplied to a utilization device such as a computer, teleprinter, facsimile reproduction device or other information storage or display device (not shown).

The operation of the transmitter of FIG. 1 in cooperation with the receiver of FIG. 2 will now be described. Reference will also be made to the wave-shapes shown in FIG. 5.

Coded pulse train generator 11 produces a bi-level (ground and negative) information-carrying pulse train, a typical portion of which is shown at M in FIG. 5. Beginning at the first positive-going edge near the origin in M, the pulse train may be said to represent the full five bit characters 01011 and 01001 in binary form (the additional increments at either end of the illustrated pulse train being bits associated with preceding and succeeding characters). Such binary characters may, for example, represent the eleventh and ninth letters (K and I), respectively, of the alphabet or, for that matter any other information in accordance with the selected code.

Timing pulse generator 14 supplies short duration, equally spaced synchronizing pulses of the type shown at H in FIG. 5 to pulse train generator 11. These synchronizing or clock pulses control the operation of generator 11 to insure that all bits (and therefore all characters) begin and end in synchronism with the fixed standard set up by the timing pulse generator 14. The coded pulse train produced by generator 11 is commonly referred to as a "synchronous" pulse train. The synchronous pulse train M is supplied to frequency shift keyer 12 for conversion to a two-frequency signal. Typically, where the information is to be transmitted by means of a single side-band radio link, keyer 12 is operated at a frequency of the order of 975 cycles per second when no pulse (ground) is supplied thereto. Keyer 12 is further arranged such that a predetermined negative voltage level supplied by generator 11 shifts the frequency of oscillation of keyer 12 down 80 cycles per second to 895 cycles per second.

The synchronous information-carrying pulse train produced by generator 11 is also supplied to shift register 13 which consists of a plurality of serially connected bistable stages or "flip-flops." In accordance with the present invention, it has been determined that shift register 13 should be arranged to introduce a signal delay of the order of seconds in order to substantially reduce the effects of atmospheric noise and fading on the transmission of information. Observations of the statistical nature of the duration of such disturbances have shown that a delay of approximately two seconds is particularly advantageous. Therefore, where each bit in the pulse train is 10 milliseconds in duration, and the shift pulses applied to register 13 are spaced 10 milliseconds apart, 200 serially connected flip-flops are provided to delay transmission of information from this channel for a period of 2 seconds.

The pulse train output of generator 11 is stepped through shift register 13, bit by bit, with each bit moving to the next succeeding flip-flop each time a synchronizing or shift pulse is applied to shift register 13 by timing pulse generator 14. Two seconds after the first pulse in the train produced by generator 11 arrives at keyer 12, the delayed first pulse is supplied by shift register 13 to keyer 15, causing the oscillation frequency of keyer 15 (e.g. 1145 cycles per second) to shift down 80 cycles per second to a frequency of 1065 cycles per second. The delayed and undelayed outputs of frequency shift keyers 15 and 12 respectively are then amplified and transmitted by cable or, for example as a pair of subcarrier signals impressed upon a 10-megacycle-per-second carrier signal produced by a single side-band transmitter.

At the receiving terminal, apparatus such as the receiver of FIG. 2 receives the two versions of the same binary information, one delayed and the other undelayed, and reconstructs the output of coded pulse generator 11 by combining selected portions of the information signals received in the two channels at the receiver.

Specifically, the delayed output of keyer 15 is supplied to first signal processing channel 16 while the undelayed output of keyer 12 is supplied to second signal processing channel 17 of the receiver. Tuner 18, arranged to amplify signals over a narrow band of frequencies including the frequency range of the delayed output, amplifiers the delayed signal while tuner 23, arranged to amplify signals over a narrow band including the frequency range of the undelayed output, amplifies the undelayed signal. The amplified signals are demodulated in their respective channels by means of demodulators 19 and 24 to reproduce a pair of pulse trains. Information appears on the pulse train of first signal processing channel 16 two seconds after the same information appears on the pulse train of second signal processing channel 17. The pulse trains, after the pulses are reshaped to eliminate rounding, as will be explained below in connection with FIG. 4, appear as shown by waveform L in FIG. 5. When compared with an undistorted signal having the same information content (see waveform A reproduced immediately above waveform L in FIG. 5), the demodulated pulse train L is seen to be distorted in terms of both pulse width and pulse spacing. Furthermore, spurious noise pulses (not shown) may be present in the signal.

The remainder of the receiver apparatus is arranged to detect the presence of distortions beyond an allowable limit in information received during a given time increment and to switch to information received during a different time increment in order to regenerate a distortion-free pulse train substantially identical to that originally produced by generator 11. This desired result is achieved by selectively switching between channels 16 and 17 to produce a single continuous pulse train from selected portions of the two pulse trains.

In general, the high frequency signals received in each of channels 16 and 17 travel over the same path from transmitter to receiver. Both high frequency signals are, therefore, subjected to substantially identical fading and noise disturbances at the same time. However, because of the delay in the transmission of information content in one signal channel with respect to the other, such disturbances affect different information content of the two signals. The period of delay between transmission of the same information in the two channels is chosen greater than the duration of disturbances normally encountered in such transmission. A suitable delay has been determined. experimentally, to be approximately two seconds.

The received signals are each inspected for distortion. Furthermore, the signals in one of the channels are delayed to bring the information in both channels back into time coincidence. It is then possible, upon detection of distortion, to switch from one channel to the other, avoiding or eliminating signals received during a "noisy" period without losing any of the transmitted information.

Under normal operating conditions (i.e., no signal disturbances or fading beyond an allowable limit), the pulse train output of demodulator 19 is supplied to pulse sampler and regenerator 20 wherein the pulse train is regenerated (that is, reproduced with steeply rising edges and appropriate voltage levels for "0" and "1" binary indications). The regenerated pulse train is supplied via terminal **20*a* to shift register 21. Furthermore, a timing pulse signal of the type produced by timing pulse generator 14 in FIG. 1, is supplied via terminal 20*c* to advance the pulse train through shift register 21. The function of this latter shift register will be pointed out below. Bistable circuit 29, under these conditions, provides an enabling signal to one input of AND 30 so as to permit the passage of the channel 16 output through AND 30 and OR 32 to a signal utilization device. The second output of bistable circuit 29, complementary to the first output thereof, effectively blocks the passage of the channel 17 output at AND 31**.

In each of the sampler and regenerator circuits 20 and 25, characteristics of the pulse trains such as pulse width and spacing are continuously monitored and compared with like characteristics of an undistorted locally generated standard pulse train. More specifically, the time of occurrence of the pulse "edges" in the signals is compared with the time of occurrence of "edges" in a standard clock pulse train. A direct correlation exists between the distortion of pulse edges (margin distortion) and errors in information recovery. Therefore, whenever the characteristics of either of the signal pulse trains deviate from those of the standard clock pulse train by more than a predetermined allowable limit, a distortion indication is produced at either or both terminals **20*b* and 25*b* as the case may be. The distortion indication, supplied via OR 22, causes bistable circuit 29 to change state, thereby enabling AND 31 and disabling or closing AND 30. At the same time, monostable circuit 28 is switched to its unstable state. The pulse train produced in channel 17 passes through AND 31 and OR 32 to the utilization device while the unacceptable pulse train segment produced in channel 16 is blocked at AND 30**.

After a predetermined interval of time, which is chosen equal both to the delay introduced by shift register 13 in the transmitter delayed channel and the delay introduced by shift register 27 in receiver channel 17, monostable circuit 28 returns to its stable state. An output pulse is then transmitted by monostable circuit 28 to bistable circuit 29, switching the latter to its original state. AND 30 and channel 16 are re-enabled while AND 31 and channel 17 are disabled.

There is no interruption in the flow of information pulses through OR 32 since the information inputs to AND 30 and 31 are substantially "in phase." That is, the sum of the signal delays between pulse train generator 11 in the transmitter and each of the AND gates 30 and 31 in the receiver are equal.

Neglecting the shift registers 21 and 26 for the moment, the following operation has taken place. Unacceptable signals received in channel 16 during a "noisy" time interval of 2 seconds duration have been rejected and, in their place, signals have been substituted which carry the same information content. These substituted signals were, however, received in channel 17 at an earlier time before the occurrence of the noise disturbance.

Shift registers 21 and 26 arranged, for example, to provide time delays of the order of 0.4 second, are included so that marginally acceptable signals preceding a completely unacceptable signal are also rejected. That is, bistable circuit 29 switches the input of OR 32 to information received in channel 17 2.4 seconds before the unacceptable signals were received in either or both channels. Bistable circuit 29, under control of monostable circuit 28, returns the input of OR 32 to the information processed by preferred channel 16 two seconds after the initial changeover from channel 16 to channel 17.

Figure 3:
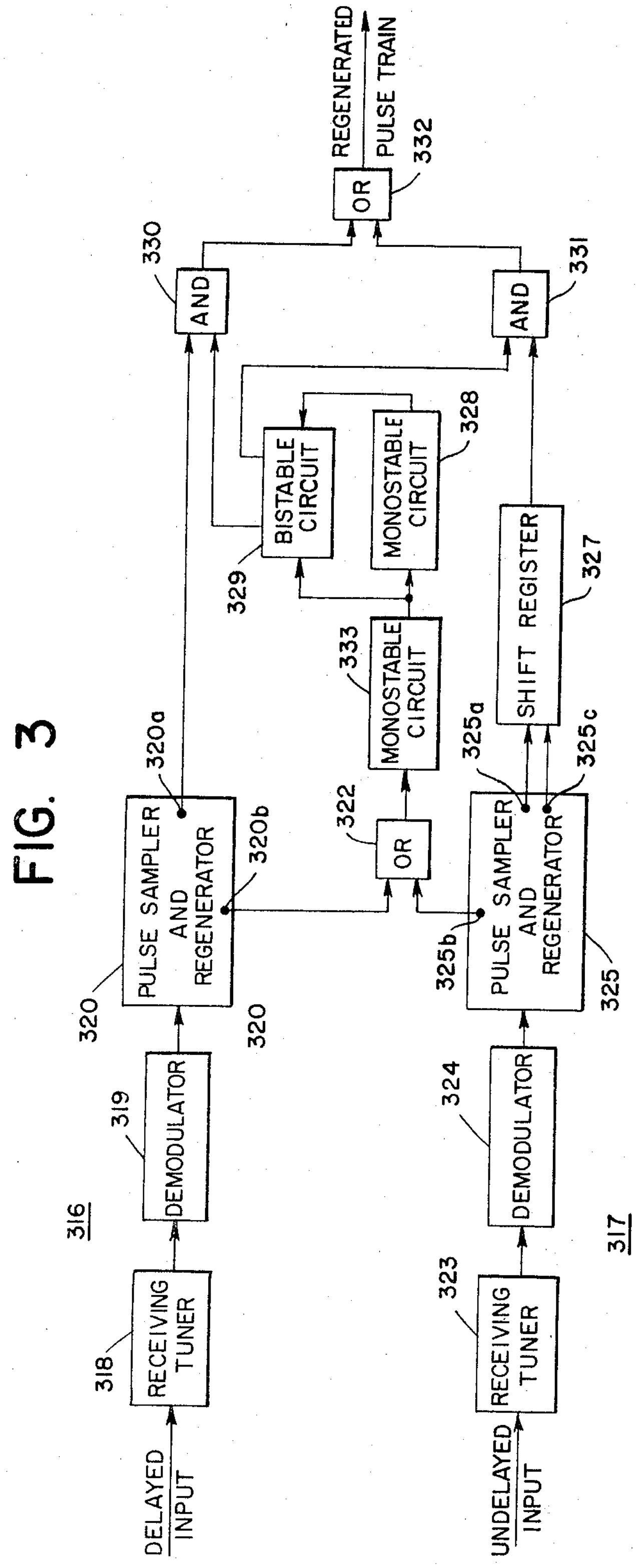
FIG. 3 is a block diagram of a second receiver system for use in a pulse communication system according to a second embodiment of the invention.

Considering the receiver shown in FIG. 3, elements which perform a function similar to that performed by elements in FIG. 2 are indicated by reference numerals corresponding to those used in FIG. 2 with the addition of the digit "3" preceding the reference numeral used in FIG. 2.

The receiver of FIG. 3 comprises a first signal processing channel 316 and a second signal processing channel 317. Chanel 316 includes a receiving tuner 318 tuned to pass the delayed chanel output of the transmitter, a demodulator 319, a pulse sampler and regenerator 320 and an AND gate 330. Second signal processing channel 317 includes a receiving tuner 323 tuned to pass the undelayed channel output of the transmitter, a demodulator 324, a pulse sampler and regenerator 324, a shift register 327 and an AND gate 331. Shift register 327 is arranged to introduce a time delay equal to the delay introduced between channels at the transmitter (i.e. the 2-second delay introduced by shift register 13 in FIG. 1). Distortion indication output terminals 320*b* and 325*b* are coupled to OR gate 322. The output of OR 322 is coupled to the input of a first monostable circuit 333, the output of which is coupled in turn both to one input of a bistable circuit 329 and to the single input of a second monostable circuit 328. The output of monostable circuit 328 is coupled to the second input of bistable circuit 329. One output of bistable circuit 329 is coupled to one input of AND 330 while the second output thereof is coupled to one input of AND 331. The outputs of AND's 330 and 331 are coupled to OR 332.

As will be noted from a comparison of FIGS. 2 and 3, the receiver of FIG. 2 includes two shift registers 21 and 26 which are not found in the receiver of FIG. 3. However, the receiver of FIG. 3 includes a monostable circuit 333 not found in the receiver of FIG. 2. Furthermore, the two outputs of bistable circuit 329 are coupled in reverse order to AND's 330 and 331 in comparison with corresponding circuit connections in the receiver of FIG. 2.

This last-mentioned difference between the two receivers results in the receiver of FIG. 3 normally passing the pulse train of channel 317 to the utilization device via OR 332.

Whenever a distortion indication is produced either at terminal 320*b* or at terminal 325*b*, a sequence of steps is commenced to switch the receiver of FIG. 3 from the pulse train output of channel 317 to the pulse train output of channel 316.

A full two seconds of information preceding the distorted information is stored in shift register 327. Therefore, it is possible to wait two seconds after the distortion indication is produced before switching channels. However, as in the receiver of FIG. 2, means are provided to switch before the distorted information reaches the output of the channel (i.e. the AND gate) so as to reject a possibly marginally acceptable portion of the pulse train as well as that portion of the pulse train which produced the distortion indication. Monostable circuit 333 is provided for this purpose and provides a delay of approximately 1.6 seconds before switchover from channel 317 to channel 316. Switchover, therefore, occurs 0.4 second before the totally unacceptable information arrives at the output of shift register 327. Two seconds later, monostable circuit 328 switches the receiver back to the pulse train output of channel 317.

Referring now to FIG. 4, a pulse sampler and regenerator suitable for use in either of the receivers of FIGS. 2 and 3 will be described.

In FIG. 4, there is shown a standard emitter-fed Clapp oscillator 401 arranged to oscillate, for example, at a frequency of 200 cycles per second, the frequency of oscillation being integrally related to the fundamental frequency of the information-carrying pulse train. The output of oscillator 401 is coupled to a timing Schmitt trigger circuit 402 which serves to convert the 200 c.p.s. sine wave to a square wave having the same fundamental frequency. The square wave output of timing trigger 402 is capacitively coupled to a divider flip-flop 403 through pulse steering diodes. Divider flip-flop 403 produces push-pull square wave output signals at a fundamental frequency which is one-half that of the output of timing trigger 402 (i.e. square waves at 100 c.p.s. such as shown at B and C in FIG. 5). The elements 401–403 serve to provide a standard clock pulse training with which the pulse train output of a demodulator such as 19 in FIG. 2 is to be compared. Flip-flop 403 also provides, at terminal "*c*," synchronizing or shift pulses such as are required in the shift registers in FIGS. 2 and 3.

An input trigger circuit 404 of the balanced Schmitt trigger type is supplied with a binary information-carrying pulse train such as the output of demodulator 19 in FIG. 2. Input trigger 404 serves to sharpen the edges of the input pulse train and to provide two pulse trains 180° out of phase with each other representative of this input pulse train (i.e. push-pull outputs). Under ideal conditions, the input pulse train is of the form shown at A in FIG. 5.

Input trigger 404 and divider flip-flop 403 are coupled, by means of signal differentiating and combining circuits 405 and 406, to a pair of monostable circuits 407 and 408, respectively. The output of monostable circuit 407 is coupled to a normally "ON" n-p-n transistor 409 while the output of monostable circuit 408 is coupled to a normally "OFF" p-n-p transistor 410. Capacitors 411 and 412 are coupled between oscillator 401 and the collectors of transistors 409 and 410, respectively. Elements 405–412 serve as speed or frequency correction circuits to maintain the standard pulse train output of flip-flop 403 substantially in synchronism with the signal produced at input trigger 404 as will be more fully explained below.

Signals produced by input trigger 404 and sampling signals produced by flip-flop 403 are also combined in differentiating and combining circuits 413 and 414 and supplied to a pulse regenerator flip-flop 415.

Distortion detection circuitry is also provided. A resistance-capacitance integrator network 416 is coupled to divider flip-flop 403. Amplification and inversion circuits 417 and a range margin Schmitt trigger 418 produce a range margin "gate" signal (see K in FIG. 5). The range margin gate output of trigger 418 is compared in differentiating and combining circuits 419 and 420 with signals produced at input trigger 404. Circuits 419 and 420 produce the distortion indication output such as is produced at the terminals labeled "*b*" in the pulse sampler and regenerator circuits shown in FIGS. 2 and 3.

In each of the differentiating and combining circuits 405, 406, 413, 414, 419 and 420, one input signal is applied to a capacitor while the second input signal is applied to a resistor. The signal applied to the capacitor is differentiated in each case and, by virtue of the diode in each circuit, an output is produced only when the combination of the applied signals is more positive than the voltage existing at the cathode of the diode.

The operation of the entire circuit of FIG. 4 will now be described in connection with the waveforms of FIG. 5.

Elements 405–12 maintain the local oscillator in synchronism with the input binary information-carrying pulse train by either adding capacitor 412 to or removing capacitor 411 from the resonant circuit of oscillator 401. This result is accomplished in the following manner.

The binary information-carrying pulse train is applied to the input of trigger 404. One output of trigger 404 (representative portions of which are shown in waveform D in FIG. 5) is supplied to the capacitors in circuits 405 and 406. When transitions occur from one level to the other in the outputs of flip-flop 403 (waveforms B and C) at the same instant as transitions occur in waveform D, the locally generated oscillations and the binary pulse train are said to be in synchronism. This condition is illustrated in the initial one-third of waveforms D–G. The positive differentiated binary signals (E) when combined in circuits 405 and 406 with the appropriate output of flip-flop 403 (F and G) produce no signals above the zero axis (i.e. no positive signals). Hence neither of the monostable circuits 407 and 408 is triggered. The frequency of oscillation of oscillator 401 is therefore left undisturbed.

The second and final thirds of waveforms D–G illustrate the signals which are produced when the push-pull outputs of flip-flop 403 are too late and too early, respectively, relative to the binary pulse train. In the event flip-flop 403 is too late, positive pulses (waveform F) are produced, triggering monostable circuit 407 to its unstable state. Transistor 409 is turned "OFF" and capacitor 411 is effectively removed from the resonant circuit of oscillator 401. The frequency of oscillation of oscillator 401 increases causing the output of flip-flop 403 to "catch up" with the binary pulse train. After a predetermined interval (of the order of one-hundredth of a binary train pulse width), monostable circuit 407 returns to its stable state, transistor 409 is switched "ON" and oscillator 401 returns to its original frequency.

In the event flip-flop 403 is too early, as shown in the final one-third of waveforms D–G, positive pulses (G) trigger monostable circuit 408 to its unstable state. Transistor 410 is turned "ON" and capacitor 412 is added to the resonant circuit of oscillator 401, causing the latter to slow down. Monostable circuit 408 returns to its stable state approximately one-hundredth of a pulse width later and oscillator 401 returns to its normal oscillation frequency. The speed correction circuits thus substantially maintain the push-pull outputs of flip-flop 403 (waveforms B and C) in synchronism with the input binary pulse train.

In order to eliminate any weight (width) or multipath (timing) distortion of the input binary pulse train before it is passed to a utilization device, the pulse train is reshaped (regenerated) in regenerator flip-flop 415. This last-mentioned circuit operates in the following manner One output (waveform C) of flip-flop 403 is coupled to the capacitors in differentiating and combining circuits 413 and 414. The resultant sampling pulse waveform which is produced is shown at H in FIG. 5. It can be seen, by comparing waveforms A, C and H, that these sampling pulses are arranged to occur substantially at the center of the pulses in the input binary train when the input binary train is undistorted. Ordinarily, however, the shape, width and timing of pulses in the binary train depart from the ideal characteristics of waveform A. Under such conditions, the input binary train is reshaped by input trigger 404. Complementary signals of the type shown by waveforms L and L′ are then supplied to the two resistor inputs of circuits 413 and 414 by flip-flop 404. It can readily be seen, by comparing waveforms L and L′ with waveform A, that the edges of pulses in the distorted trains (L and L′) are displaced from edges of similar pulses in the undistorated train (A).

Regenerator flip-flop 415 is triggered by the combined signals applied to circuits 413 and 414. Flip-flop 415 is triggered on either one side or the other depending upon which side thereof (if any) is supplied with a substantially ground level signal at the moment the sampling pulses (H) occur. Flip-flop 415 regenerates an undistorted signal having the same information content as waveform L but delayed by ½ bit as shown by waveform M.

The final function peformed by the pulse sampler and regenerator of FIG. 4 is that of producing a distortion indication at terminal "*b*" whenever the input binary pulse train deviates from a standard established by the internally generated pulse trains B and C by more than a predetermined amount. This operation will now be described.

One output of divider flip-flop 403 (waveform C) is coupled to R–C integrator 416, producing a sawtooth waveform (I). The integrated signal is amplified and "inverted" (waveform J) in circuit 417. The output of circuit 417 is supplied to range margin trigger 418. Trigger 418 is arranged to change state when the signal applied thereto (J) passes through a predetermined triggering level. Trigger 418 thus produces a "range gate," such as is shown in waveform K. Each range gate is substantially symmetrically disposed with respect to a negative-going edge of waveform C. The push-pull outputs of input trigger 404 (waveforms L and L′) are differentiated in circuits 419 and 420. Sharp pulses, coincident with the edges in waveforms L and L′ are therefore produced. Because of the presence of the diodes in circuits 419 and 420, only the positive pulses are effective. These positive pulses are combined with the range gate waveform as shown in K. Whenever the edges or transistions in the binary pulse train fall outside of the range gates, the shape pulses fall outside the range gates and positive signals such as those shown remote from the origin in waveform K are produced at terminal "*b*".

The acceptable limits of distortion may be selected by varying the triggering level of the range margin trigger. This may be accomplished by adjusting a potentiometer **418*a* in trigger 418**.

While the invention has been described in terms of several embodiments thereof, the invention itself is not limited to the construction of those embodiments. For example, the delayed and undelayed transmitter channels, rather than being assigned to different frequencies, may utilize a common time-shared transmission frequency.

Furthermore, while circuits have been described wherein the choice of information to be delivered to the output is made dependent upon conformance of pulse width and spacing to a standard, other characteristics such as signal strength or signal to noise ratio may be set up as the standard characteristic for an acceptable pulse train.

Frequencies of operation have been chosen merely for illustrative purposes. If, for example, a higher rate of information flow is required, or different pulse coding is used, different operating frequencies would be used in, for example, the pulses sampler and regenerator of FIG. 4.

This invention may also be used in conjunction with the other diversity techniques (space and frequency) mentioned above, if desired.

The full scope of this invention is set forth in the appended claims.

I claim:

1. A communication system comprising a transmitter and a receiver, said transmitter comprising means for producing first and second information-carrying signals having substantially identical information content, means for delaying the first of said signals for a predetermined time interval and means for transmitting said delayed first signal and said undelayed second signal to said receiver, said receiver comprising first and second signal processing channels for receiving delayed and undelayed information-carrying signals respectively, means for detecting and for producing indications of distortion of received signals upon reception thereof at said receiver, mean in said second channel for delaying the undelayed signals to bring signals in each channel having the same information content into time coincidence, and channel output selection means responsive to said distortion indications for selecting time-sequential portions of signals from each of said channels so brought into time coincidence to reconstruct a single information-carrying signal having substantially the same information content as said first and second signals produced at said transmitter.

2. A pulse communication system comprising a transmitter and a receiver, said transmitter comprising means for producing an information-carrying pulse train, signal delay means coupled to said pulse train producing means for delaying said pulse train for a predetermined time interval and signal transmission means coupled to said pulse train producing means and to said delay means for transmitting signals representative of delayed and undelayed pulse trains to said receiver, said receiver comprising first and second signal processing channels for receiving and processing signals representative of delayed and undelayed pulse trains respectively, each of said signal processing channels comprising sampling means for comparing characteristics of the pulse train processed in that channel with like characteristics of an undistorted pulse train, each of said channels further comprising distortion indicating means coupled to said sampling means for producing distortion indications in response to deviations in excess of a predetermined allowable limit of the characteristics of a processed pulse train from the like characteristics of said undistorted pulse train, said second channel further comprising means for delaying the pulse train processed in said second channel for a time duration equal to the time delay produced by said signal delay means in said transmitter, said receiver further comprising channel selection means for selecting the output of one of said channels and, in response to a distortion indication, for selecting the output of the other of said two channels for transmission, to a utilization device, of a single pulse train derived from substantially undistorted segments of the two pulse trains processed in said two channels.

3. A pulse communication system according to claim 2 wherein said first channel is selected as a preferred channel and said receiver further comprises second and third means for delaying pulse trains coupled each in a separate one of said signal processing channels after said sampling means therein in the sense of signal flow in said channels, the time delays produced by said second and third means being substantially equal to each other and less than the time delay produced by said signal delay means in said transmitter.

4. A pulse communication system according to claim 2 wherein said second channel is selected as a preferred channel and said channel selection means comprises delay means coupled to said distortion indicating means for delaying the selection of the output of said first channel, in response to a distortion indication, for a period of time less than the time delay produced by said delay means in said transmitter.

5. A pulse communication system according to claim 2 wherein said channel selection means further comprises means for reselecting said one of said channels, following the selection of the other of said two channels, after the lapse of an interval of time substantially equal to the time delay produced by said time delay means in said transmitter.

6. A pulse communication system comprising a transmitter and a receiver, said transmitter comprising a pulse generator, a first frequency shift keying apparatus coupled to said pulse generator, a first shift register coupled to said pulse generator and a second frequency shift keying apparatus coupled to said first shift register, said receiver comprising first and second signal processing channels, each of said channels comprising means for receiving and demodulating one of the frequency shift keyed signals produced at said transmitter, each of said channels further comprising a timing pulse generator and means for comparing characteristics of the output of said timing pulse generator with characteristics of the demodulated frequency shift keyed signal in that channel, said receiver further comprising distortion indication means for producing indications when the characteristics of demodulated signals in either channel differ from the characteristics of the timing pulse generator output in that channel by more than a predetermined allowable limit, said receiver further comprising a shift register in one of said channels having the same number of stages as said shift register in said transmitter, two gate circuits coupled each to the output of a separate one of said channels, and channel selection means coupled to said gate circuits responsive to said distortion indications for selectively coupling said first and second channels to a signal utilization device whereby a single pulse train containing substantially less distortion than either of the pulse trains produced in the two signal processing channels but having substantially the same information content as the pulse train originally generated in the transmitter is reproduced.

7. A receiver for use in a communications system wherein first and second information-carrying signals having substantially identical information content are transmitted to the receiver, the information content of said first signal being delayed in time with respect to like information content of said second signal, said receiver comprising first and second signal processing channels for receiving first and second information-carrying signals respectively, said receiver further comprising means for detecting and producing indications of distortion of signals upon reception thereof in said first and second channels, means for delaying signals in said second channel for a period equal to the time delay between the like information content of said first and second signals, and channel selection means for coupling said channels one at a time to a utilization device, said selection means being responsive to distortion indications for switching from one channel to the other channel, the signal in said other channel having been received at a different time but having the same information content as the unacceptable distorted signal in the one channel.

References Cited

UNITED STATES PATENTS

| | | | |
|---|---|---|---|
| 2,898,455 | 8/1959 | Hymas et al. | 325—304 |
| 2,899,548 | 8/1959 | Boughtwood et al. | 325—30 X |
| 3,035,169 | 5/1962 | Griffith | 325—56 |
| 3,213,370 | 10/1965 | Featherston | 325—304 |

NEIL C. READ, *Primary Examiner.*

D. J. YUSKO, *Assistant Examiner.*